(12) United States Patent
Guimbard et al.

(10) Patent No.: US 9,004,865 B2
(45) Date of Patent: Apr. 14, 2015

(54) BLADE WITH NON-AXISYMMETRIC PLATFORM

(75) Inventors: Jean-Michel Guimbard, Cely en Biere (FR); Olivier Kueny, Montgeron (FR); Ludovic Pintat, Alfortville (FR)

(73) Assignee: SNECMA, Paris (FR)

( * ) Notice: Subject to any disclaimer, the term of this patent is extended or adjusted under 35 U.S.C. 154(b) by 678 days.

(21) Appl. No.: 12/919,798

(22) PCT Filed: Feb. 27, 2009

(86) PCT No.: PCT/FR2009/050318
§ 371 (c)(1),
(2), (4) Date: Aug. 27, 2010

(87) PCT Pub. No.: WO2009/112775
PCT Pub. Date: Sep. 17, 2009

(65) Prior Publication Data
US 2011/0014056 A1   Jan. 20, 2011

(30) Foreign Application Priority Data

Feb. 28, 2008   (FR) ..................................... 08 51273

(51) Int. Cl.
| | | |
|---|---|---|
| *F01D 5/18* | (2006.01) | |
| *F04D 29/38* | (2006.01) | |
| *F01D 5/14* | (2006.01) | |

(52) U.S. Cl.
CPC ................ *F01D 5/143* (2013.01); *F01D 5/145* (2013.01); *Y02T 50/673* (2013.01); *F05D 2240/80* (2013.01); *F05D 2250/70* (2013.01); *Y10S 416/02* (2013.01)

(58) Field of Classification Search
USPC .... 416/193 A, 90 R, 191, 204 R, 223 A, 248, 416/DIG. 2; 415/191, 914, 208.1
See application file for complete search history.

(56) References Cited

U.S. PATENT DOCUMENTS

| | | | | |
|---|---|---|---|---|
| 6,017,186 | A   * | 1/2000  | Hoeger et al. ................. | 415/181 |
| 6,283,713 | B1 * | 9/2001  | Harvey et al. ............. | 416/193 A |
| 6,368,055 | B1 * | 4/2002  | Matsuda ....................... | 415/192 |
| 6,561,761 | B1 * | 5/2003  | Decker et al. ............. | 415/173.1 |
| 2006/0140768 | A1 | 6/2006 | Tam et al. | |
| 2006/0233641 | A1 * | 10/2006 | Lee et al. ................... | 415/208.1 |
| 2007/0258818 | A1 * | 11/2007 | Allen-Bradley et al. . | 416/193 A |

FOREIGN PATENT DOCUMENTS

EP        1 681 438          7/2006

OTHER PUBLICATIONS

U.S. Appl. No. 12/919,781, filed Aug. 27, 2010, Guimbard, et al.
U.S. Appl. No. 12/919,722, filed Aug. 26, 2010, Guimbard, et al.
Office Action issued May 21, 2013 in Japanese Application No. 2010-548156 (With English Translation).

* cited by examiner

*Primary Examiner* — Edward Look
*Assistant Examiner* — Christopher J Hargitt
(74) *Attorney, Agent, or Firm* — Oblon, McClelland, Maier & Neustadt, L.L.P.

(57) ABSTRACT

A blade for a turbomachine impeller including an airfoil and at least one platform at one end of the airfoil, the blade configured to be arranged with a plurality of substantially identical blades so as to form a ring, the platform surface having a suction surface profile and a pressure surface profile respectively along the suction surface and the pressure surface. In the blade, the pressure surface profile including a pressure surface recessed part is located axially in an upstream half of the airfoil. Due to this configuration, efficiency of the blade is improved.

19 Claims, 4 Drawing Sheets

BLADE WITH NON-AXISYMMETRIC PLATFORM

This invention relates to a blade for a turbomachine impeller comprising an airfoil formed with a pressure surface, a suction surface, a trailing edge, and a leading edge, the blade further comprising a platform extending at one of the ends of the airfoil in a direction which is globally perpendicular to a longitudinal direction of the airfoil, the blade being adapted to be arranged with a plurality of substantially identical blades to form a ring around a ring axis and define therealong upstream and downstream directions, wherein the airfoils are arranged substantially radially in the ring, with the adjacent portions of the platform surfaces of two adjacent blades located between their respective airfoils defining an inter-airfoil surface, the platform surface having a suction surface profile and a pressure surface profile respectively along the suction surface and the pressure surface.

Joining such blades around a common axis allows for composing an impeller, the axis of which is the axis of the ring. This impeller may be mobile, and thus receive energy from the jet, or communicate energy to the jet traveling through the impeller; it may also be fixed, and in this case, its function is to canalize the jet.

The blade can be a distinct part as such, or integrated with other blades so as to form for instance a distributor sector or a multiple bladed disk.

Usually, a turbomachine comprises several blade stages, each forming a wheel or impeller, successively arranged along the fluid path through the turbomachine (There may be several paths, especially in the case of bypass engines). The efficiency of the turbomachine is directly related to the capability of each of the impellers, and thus in particular each of the blades belonging thereto, to efficiently interact with the jet, i.e. without unnecessarily dissipating energy. It should be noted that namely in aeronautical turbomachines, such as turbojets or turboprops, jet speeds may be significant, namely supersonic: for a blade arranged in such a jet, it is essential to optimize the flow quality of the jet around the blade.

In the blade, the shape of the airfoil must naturally be optimized so as to efficiently guide the jet, in which the airfoil is located, or to receive or transmit maximum energy to the jet without dissipating energy by heating.

However, although the shape of the airfoil is important, it has been found that the shape of the surface of the platform on the side of the airfoil also plays an essential part for the flow quality of the jet through the blade. Thus, as an example, the dissipative losses at this surface in a low pressure turbine stage of a turbomachine can reach 30% of the total losses generated in the stage.

For the sake of simplicity, in the following, a platform surface designates the surface of the platform on the side of the airfoil, without repeating on which side of this surface it is located.

The passage of the jet around the blades as those indicated in the preamble is illustrated in FIGS. 1 and 2.

FIG. 1 shows three identical blades 10, which are part of an impeller 100 presented in FIG. 2. Each blade 10 is designed to be assembled with other identical blades 10 so as to form the impeller 100. This impeller is essentially composed of the blades 10 mounted on a rotor disk 20. In this impeller 100, the blades 10 are mounted in an axially symmetric manner around the axis A of the wheel. Globally, the fluid jet flows along the axis A from an upstream side to a downstream side of the wheel.

Each blade 10 comprises an airfoil 50, a platform 60, as well as a root 66 in the represented specific case of a rotor blade for fixing the blade to a rotor disk. The platform 60 extends in a direction which is globally perpendicular to the longitudinal direction of the airfoil 50 and comprises a platform surface 62 on the side of the airfoil. As the blades 10 are assembled against each other, the platforms thereof join in pairs so as to create a substantially continuous surface, the so-called 'inter-airfoil' surface 70 extending from the pressure surface 56 of one airfoil to the suction surface 58 of the neighboring airfoil. The platform surface 62 is linked to the outer surfaces of the airfoil 50 by connecting surfaces 18 (which are substantially connecting fillets having a tapered radius).

It should also be noted that in the examples represented in FIGS. 1 to 3, the surface 62 of the platform 60 is a surface of revolution, i.e. that the area thereof is substantially part of a surface of revolution around the axis A of the impeller. Herein, a surface of revolution around an axis designates a surface generated by rotating a curve around said axis. Such a shape is common for blade platform surfaces for turbomachine impellers.

In the flow, when the jet reaches the leading edge of an airfoil 50, it splits in two, going partly past the side of the pressure surface 56 and partly past the side of the suction surface 58 of the airfoil 50. FIG. 3 schematically presents how the pressure field is established in the 'inter-airfoil channel' 30 extending between the airfoils.

FIG. 3 is a sectional view perpendicular to the respective axes of the airfoils of two blades 10 and 10' mounted side by side in an impeller. More particularly, FIG. 3 shows the pressure field which can usually be observed close to the inter-airfoil surface 70 between the suction surface 58 of a first airfoil and the pressure surface 56' of a second airfoil.

FIG. 3 comprises an iso-pressure curve 40 corresponding to a relatively high pressure, and an iso-pressure curve 42 corresponding to a relatively low pressure, these pressures being observed in the jet during operation of the turbomachine. A steep pressure gradient 3 is created between the pressure surface and the suction surface of the two airfoils due to pressure being greater close to the pressure surface than close to the suction surface. Under the effect of this pressure gradient 3, a transverse flow to the 'inter-airfoil' channel 30 is generated at the root of the airfoils, and particles thus deflected are pushed towards the suction surface of the airfoil 50. Thereby, within the 'inter-airfoil' channel 30, strong secondary flows not directed in the main direction of flow are created which will generate eddies, namely close to the suction surface.

In order to try to limit unnecessary dissipation of energy resulting therefrom close to the inter-airfoil surface, the U.S. Pat. No. 7,220,100 proposes an inter-airfoil surface shape comprising mainly a convex ramp located immediately adjacent to the pressure surface of the airfoil, and a concave area located immediately adjacent to the suction surface of the airfoil, each of these areas being located substantially at the mid-point of the airfoil chord. In spite of this development, there is still a number of energy dissipating eddies in the space between the two airfoils, and therefore, there is a need for a blade shape further reducing the stray eddies formed in this space.

The U.S. Pat. No. 6,283,713 proposes another shape for the inter-airfoil surface, comprising on the one hand a convex region adjacent to the suction surface of the blade, and a concave one adjacent to the pressure surface of the blade, with these two regions having a significant dimension as they extend over most of the length of the blade chord. According to an alternative, the blade comprises at the trailing edge a boss and a recess, respectively located on the side of the suction surface and the pressure surface. However, these configurations of the inter-airfoil surface do not allow for the problem of unnecessary energy dissipation close to this surface to be solved efficiently.

It is a first object of the invention to propose a blade like the one presented in the preamble, which minimizes unnecessary dissipations of energy while the jet is interacting with the blade, and which still has low production cost by being relatively easy to manufacture.

This objective is achieved in that the pressure surface profile (85) has a pressure surface recessed part located axially in the downstream half of the airfoil, and preferably located axially between 60% and 100% of the airfoil. Indeed, the presence of this pressure surface recessed part allows for further improving the efficiency of the blade and reducing the dissipative eddies by stabilizing the flow close to the downstream part of the blade. At the pressure surface recessed part, the platform surface has a depression extending substantially against the pressure surface, in the downstream half of the airfoil.

First of all, it should be noted that above and in the following 'axially' refers to the axial position along the axis A of the ring.

Also, a position axially defined with respect to the airfoil can also be defined equivalently with respect to the extension along axis A, of a cross-section of the airfoil close to the platform of the blade. Indeed, as the airfoil is arranged radially in the ring, the extension thereof along axis A, or the extension of a cross-section, are substantially identical.

The cross-section of the airfoil can for instance be the section in the plane (P) represented in FIG. 1, and represented by profiles 72 and 72' in FIG. 3. This section axially extends from line 46 at the highest upstream point of the airfoil (close to the platform surface) to line 48 corresponding to the lowest downstream point of the airfoil, defining an amplitude from upstream to downstream between 0 and 100% with respect to the airfoil.

Finally, it is important to note that in this application, the indication that an element is located axially within an interval, without further detail, means that an essential, major part (about 90% or 95 of this element) is contained within this interval, with the possibility of a very small part (5 to 10% at most) lying outside thereof. Conversely, the indication that an element is mainly located within an interval only means that at least 50% of this element is located within this interval.

A major advantage of the invention is due to the fact that the special shape of the platform surface previously exhibited allows for significant reduction of stray turbulent flows between the airfoils close to the inter-airfoil surface. The inter-airfoil surface has a relatively simple, aerodynamically efficient shape, and the production of cost of which is still reasonable, without creating any special problem in cast manufacturing.

In this document, the various examples used have a blade with a platform located on the center side with respect to the airfoil, in the radial direction, and not on the outside. It should be noted in this respect that the invention equally aims at a blade comprising a platform located at the head of the airfoil, i.e. on the side radially opposite the center of the ring, and a blade comprising a platform located at the root of the airfoil, on the inside with respect to the ring. A blade comprising both types of platforms is also possible, with at least one platform being arranged so as to comprise a platform surface having the characteristics stated before.

Moreover, the invention aims at any blade capable of being integrated into a turbomachine, and in particular into aeronautical turbomachines. The inventive blade turns out to be particularly useful in turbine stages, especially of low pressure turbines.

According to one embodiment of the blade, most of the inter-airfoil surface is generated by moving a line segment based on said suction surface and pressure surface profiles. Such a platform shape allows for particularly simple production, namely by casting.

According to one embodiment, in the blade, the suction surface profile has a so-called 'suction surface' recessed part, located axially in an upstream half of the airfoil, and a so-called 'suction surface' boss-like part, located axially in the downstream half of said suction surface recessed part. This special platform surface shape will lead to a significant reduction of stray turbulent flows between the airfoils close to the inter-airfoil surface.

Indeed, the presence on the suction surface profile of the suction surface recessed part followed by the suction surface boss-like part results in that close to the suction surface, in the (axially) upstream part of the airfoil, the jet speed is decreasing while pressure thereof is increasing, and conversely, downstream of this boss-like part, the jet speed is increasing and pressure decreasing so as to limit jet separations. This results in a decrease of the pressure gradient in the inter-airfoil channel and a reduction of stray energy dissipating eddies.

According to one embodiment, the suction surface boss-like part is located in the downstream half of the airfoil.

According to one embodiment, the sections of the platform surfaces of the blades assembled into a ring, in the vicinity respectively upstream and downstream of the airfoils, these sections being perpendicular to the ring axis, defining an upstream median circle and a downstream median circle, with both circles defining a cone coaxial to the ring axis, said suction surface recessed part being depressed with respect to the cone, and said suction surface boss-like part protruding with respect to the cone.

The upstream 14 and downstream 15 median circles are apparent in FIG. 1. These circles are located in the planes perpendicular to the axis of the ring, and are the median circles representing sections of the platform surfaces in these planes, upstream and downstream of the airfoils and close thereto. The cone 16 is the cone going through the two coaxial circles 14 and 15, and may degenerate into a cylinder if both circles have the same radius. Plane P, which allows to define the substantially transverse section of the airfoil used as a reference, extends in a substantially perpendicular fashion to a normal of the cone 16 going into the airfoil.

It is when the first recessed and boss-like parts of the suction surface profile are depressed or protruding with respect to the cone that the effect thereof is most prominent.

According to one embodiment, the platform surface has an area of revolution with respect to said ring axis, close to the trailing edge of the airfoil. The presence of an area of revolution at the trailing edge of the airfoil allows to obtain a highly laminar flow at and downstream of the trailing edge. Furthermore, this area of revolution allows for this part of the blade to minimize the tool-making cost and thus the production cost of the blade.

According to one embodiment, the pressure surface profile has a pressure surface boss-like part, located axially mainly in the upstream half of the airfoil. The presence of this pressure surface boss-like part allows to accelerate the flow speed thereat and reduce pressure close to the pressure surface. Thereby, the pressure gradient and the stray dissipative eddies in the inter-airfoil channel can be further reduced.

Advantageously, said pressure surface boss-like part extends axially over more than three quarters of the airfoil, so as to increase the flow speed on the boss and thereby maximize the effect induced on the jet flow.

According to one embodiment, the platform surface further comprises an area of revolution on the side of the pressure surface of the airfoil, and located axially at about 75% of the airfoil. More precisely, this area may extend over between 50% and 90% of the section of the previously mentioned airfoil. The part of the production tools corresponding to this area is thus particularly easy to make, thereby providing an equivalent reduction in the production cost of the blade.

The preceding embodiment allows to maintain excellent efficiency for the device while reducing the production cost of the device, due to the presence of the indicated area of revolution.

Finally, in an inventive blade, at least one of said recessed or boss-like parts can continue or extend upstream or downstream of the inter-airfoil surface. A second object of the invention is to propose a high performance turbomachine distributor sector, and the production cost of which is still reasonable. This objective is achieved in that the turbomachine distributor sector comprises at least one blade like those defined before.

A third object of the invention is to propose a high performance impeller, and the production cost of which is still reasonable. This objective is achieved in that the impeller comprises a plurality of blades like those defined before.

A fourth object of the invention is to propose a high performance turbomachine, and the production cost of which is still reasonable. This objective is achieved in that the turbomachine comprises at least one impeller like the one defined previously.

The invention will be better understood and the advantages thereof will be more apparent from reading the following detailed description of embodiments represented by way of example and not being restrictive. The description refers to the appended drawings, in which:

FIG. 1 already described is a perspective view of three known blades arranged in their relative position as they are mounted in an impeller;

FIG. 2 already described is a perspective view of an impeller comprising the blades of FIG. 1;

FIG. 3 already described is a section perpendicular to the axis of the airfoils of two blades represented in FIG. 1 showing the pressure fields in the space separating both airfoils;

It should be noted that for the sake of simplicity, if an element appears on various figures, identically or in a slightly different form, the same number is assigned thereto in the various figures, and the element is described only the first time it is mentioned.

Figure 4:
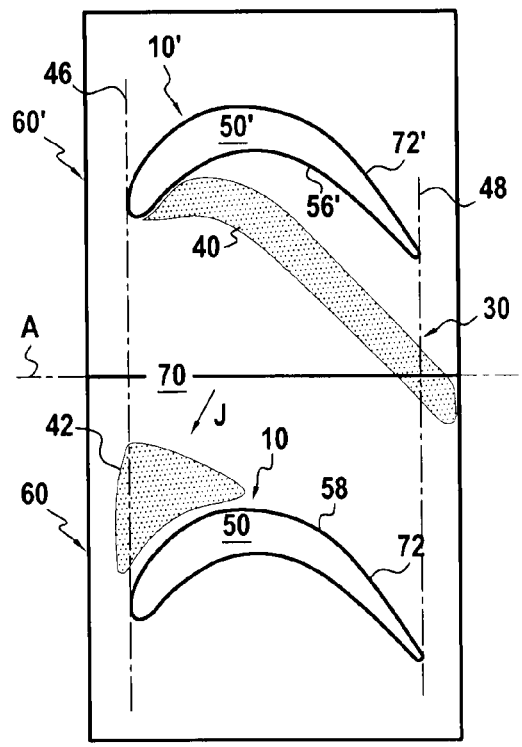
FIG. 4 is a section similar to the section of FIG. 3, but with both airfoils being part of blades according to the invention.

With reference to FIG. 4, we will now describe the effect produced on the pressure field in the inter-airfoil channel by a blade according to the invention.

The present invention defines a platform surface shape allowing to minimize stray turbulent phenomena close to the inter-airfoil surface, and thereby to increase the efficiency of the blade and thus the impeller. Comparing FIGS. 3 and 4 shows the relative effect of the invention on the pressure field in the inter-airfoil channel 30 allowing to obtain the specific shape of an inventive blade.

Figure 1:
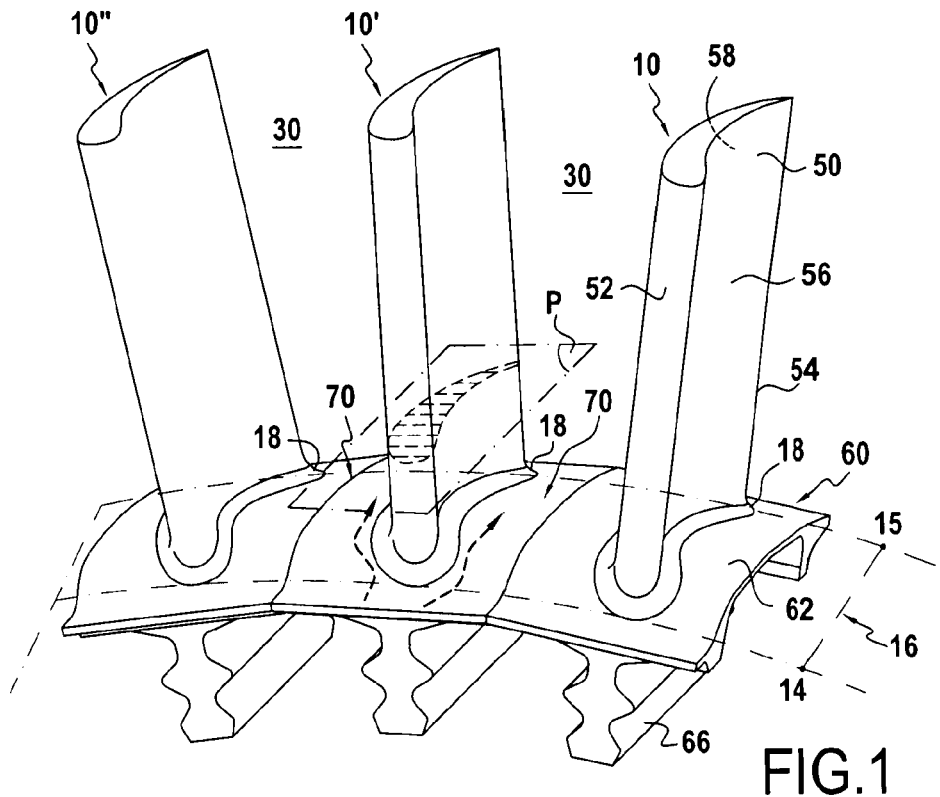
Figure 2:
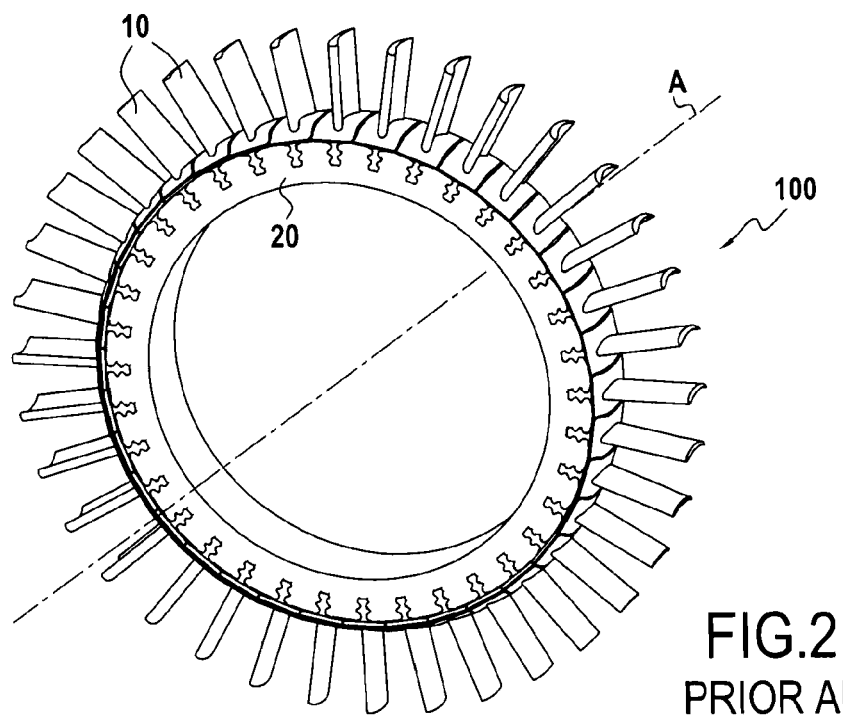
Figure 3:
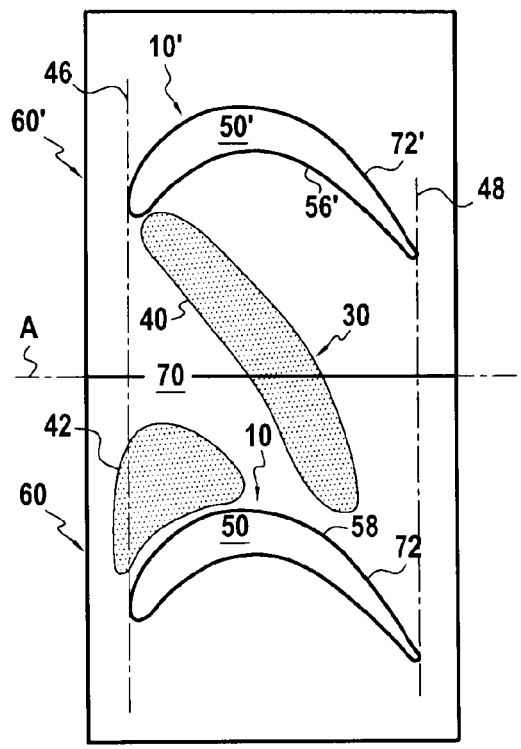

While in FIG. 3, respectively high and low pressure areas 40, 42, are relatively close to each other, in FIG. 4, it can be seen that they are further apart from each other. Consequently, the pressure gradient is substantially reduced, as well as the tendency of particles to migrate from the pressure surface to the suction surface thereby causing stray eddies.

With reference to FIGS. 5 to 8, we will now describe the arrangement of a blade according to the invention.

Figure 8:
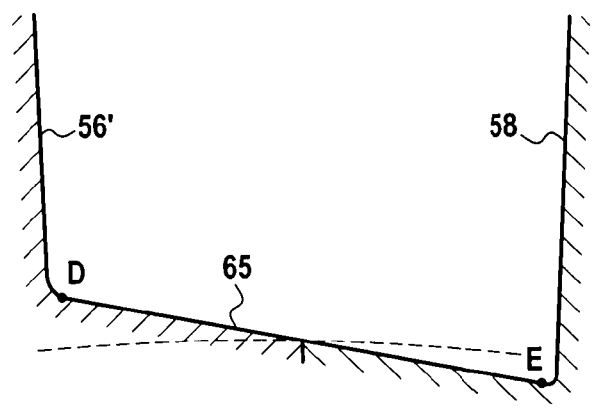
FIG. 8 is a section substantially perpendicular to the axis of the ring, of the inter-airfoil channel between two blades according to the invention.

FIG. 8 presents a section of two blades perpendicularly adjacent to the ring axis. In accordance with the invention, this section forms a line segment 65 between the pressure surface and the suction surface. Moving this line segment 65 along the two suction surface and pressure surface profiles 80 and 85 presented in FIG. 5 will generate the inter-airfoil surface 70, or at least most of it. Most of it meaning preferably at least three quarters of this surface. Naturally, the ends of the segment will move in the same direction, e.g. from the upstream to the downstream of the blade, along the two profiles of the pressure surface and the suction surface.

Figure 5:
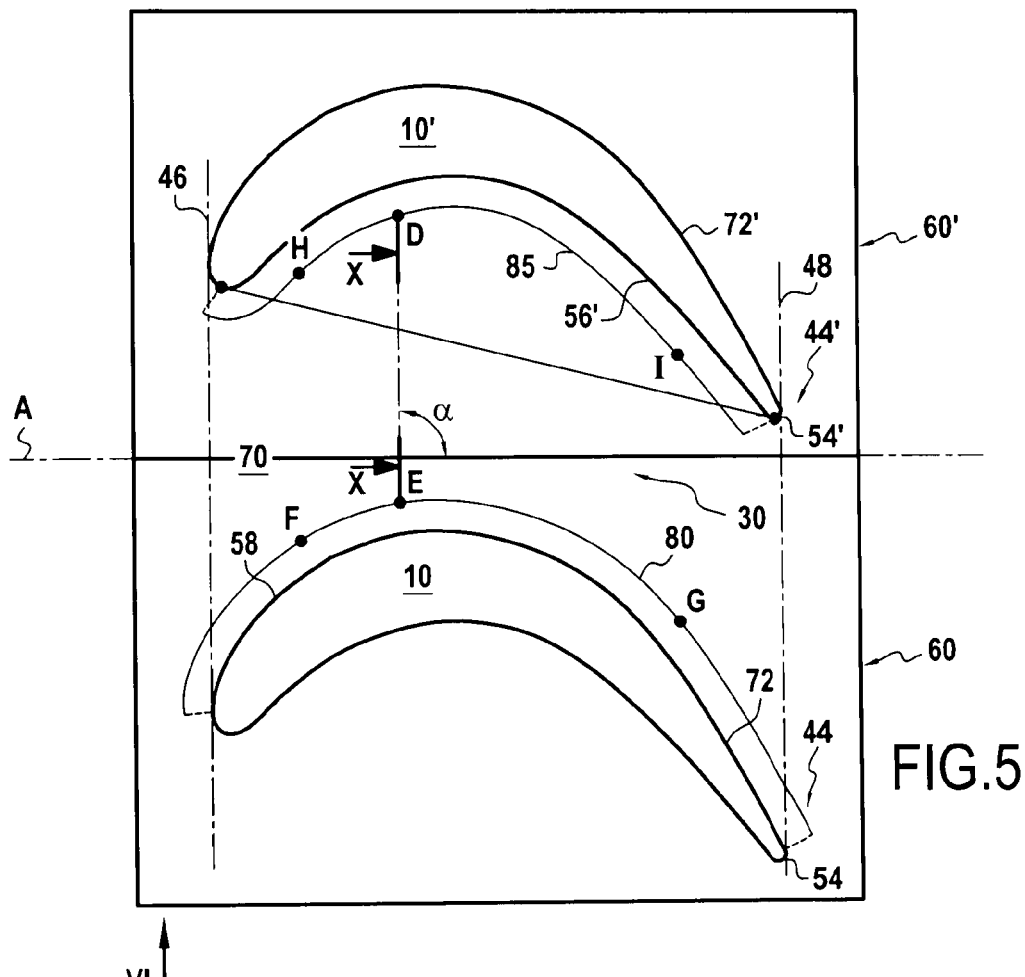
FIG. 5 is a sectional view perpendicular to the axis of the airfoils of two blades according to the invention.

FIG. 8 represents this segment 65 in a position coinciding with segment DE represented in FIG. 5. In this specific instance, the angle a with respect to axis A is then 90°. In general, it is only preferable for the line segment to form an angle a varying between 90°±30° (i.e. 60° to120°) with respect axis A.

Figure 6:
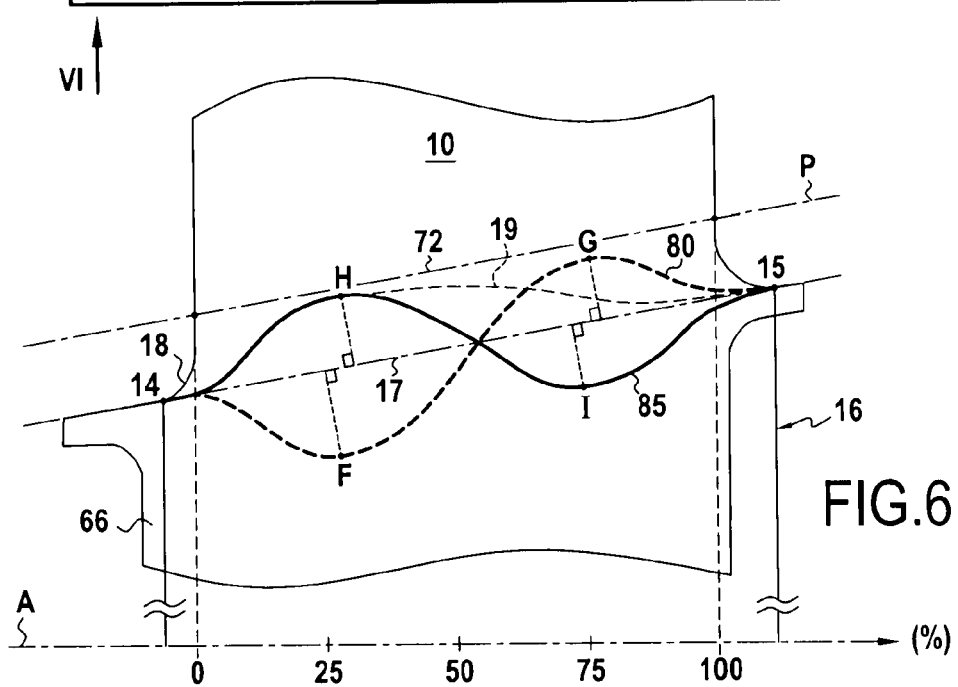
FIG. 6 is a partial side view of a blade according to the invention, having the profile curves respectively along the suction surface and along the pressure surface, in a blade according to the invention.

FIG. 5 shows sections 72 and 72' respectively of the two blades 10 and 10' in a view along the longitudinal axis of these two airfoils. As shown in FIG. 6, section 72 (like the identical section 72') is the intersection of airfoil 50 with a plane P, established close to platform 60 of blade 10, at a distance from the platform sufficient for the section to actually be that of airfoil 50 without showing the connecting surfaces 18 between airfoil 50 and platform 60.

FIG. 5 further shows profiles 80 and 85 of the platform surface 62 of a blade according to the invention.

Profiles 80 and 85 are the previously mentioned suction surface and pressure surface profiles, respectively located along the suction surface and the pressure surface. In other words, they are curves going over the platform surface, at a substantially constant distance respectively of the suction surface and the pressure surface.

Preferably, these profiles are located close to the airfoil, either completely against the airfoil, or outside of the connecting area between the airfoil and the platform surface 62. When the profiles are recorded at a certain distance from the airfoil, this means that the shapes (recesses and bosses) they have are formed inside the inter-airfoil channel, and not only on one side thereof. In this design, the effect of the reliefs corresponding to the recesses and bosses of the profile is increased.

FIG. 6 shows the part of the blade located close to platform 60 thereof in a side view (symbol VI in FIG. 5). This figure shows the passage points of the median circles upstream 14 and downstream 15 of the airfoil, as well as the section 17 of the cone 16 going through these two circles.

The suction surface profile 80 firstly comprises a suction surface recessed, concave part, F, axially extending inside the upstream half of the airfoil 72. This part of the profile 80 is on the side opposite the side of the jet with respect to section 17 of the cone, i.e. depressed with respect to the cone or at the surface of the cone. Moreover, profile 80 comprises a suction surface boss-like, convex part, G, axially extending in the downstream half of airfoil 72. This part of profile 80 is on the side of the jet with respect to section 17 of the cone, and thus protruding with respect to the cone.

Thus, the suction surface profile 80 of the inter-airfoil surface 70 firstly shows a suction surface recessed part F followed by a suction surface boss-like part G. More precisely, the suction surface recessed part (F) is located axially between 0 and 40 of the airfoil, and the suction surface boss-like part is located axially between 40 and 80% of the airfoil.

Advantageously, the bottom point (i.e. the one closest to the axis) of the first recessed part (F) is located between 12% and 35% of the airfoil (50), and preferably between 15% and 25% of the airfoil from the upstream.

The pressure surface profile has a relatively inverted configuration, with a pressure surface boss-like part, H, located axially mainly in the upstream half of the section of airfoil 72, and a pressure surface recessed part, I, located axially in the downstream half of the section 72 of the airfoil. The different recessed or boss-like parts are respectively depressed and protruding with respect to cone 16.

The pressure surface boss-like part is located axially between 0 and 50% of the airfoil (or even between 0 and 60% of the airfoil), and the pressure surface recessed part is located axially downstream thereof, between 60% and 100% of the airfoil.

In another embodiment, the pressure surface profile does not have any minimum in the downstream half thereof, and stays substantially completely on the side of the airfoil with respect to the cone. This variant is symbolized by the dotted line 19 in FIG. 6. In this embodiment, the pressure surface profile essentially extends from the side of the jet with respect to the cone 16 because it is formed mainly by the boss-like part H, extending axially over more than three quarters of the airfoil (more precisely, the projection on axis A of the boss-like part has an extension greater than three quarters of the extension of the projection on axis A of the cross-section of the airfoil).

In this embodiment, the pressure surface profile then does not have any recessed part, the boss-like part directly connecting to the part (generally a part of revolution) of the profile at the trailing edge.

It should further be noted that profiles 80 and 85 are ending substantially tangentially to the cone, close to the trailing edge. This due to the fact that the platform surface 62 comprises an area of revolution 44' extending close to the trailing edge.

Figure 7:
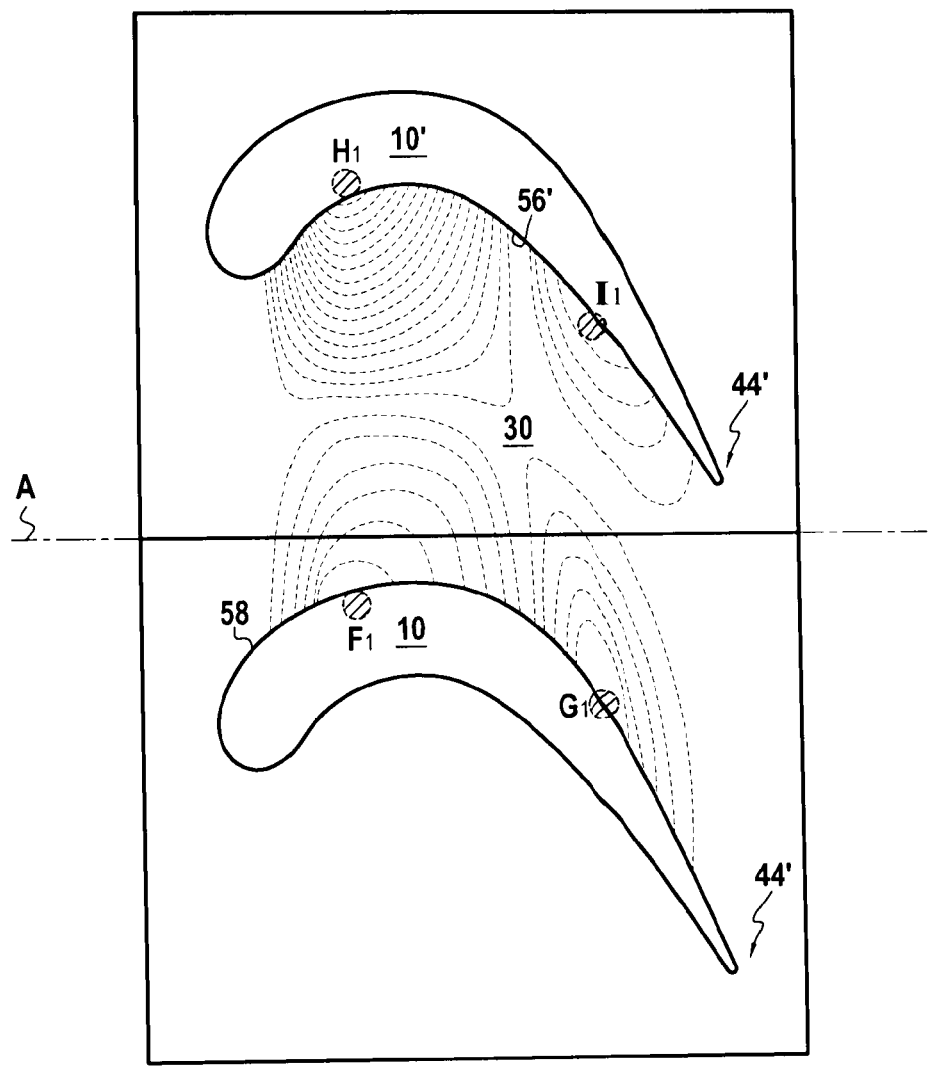
FIG. 7 is a section of two aerodynamical airfoils of a blade according to the invention, showing the shape of the inter-airfoil surface by means of contour lines.

FIG. 7 shows by means of contour lines the shapes of the inter-airfoil surface 70 between the two contours 72 and 72' previously presented in relation with FIG. 5. Thus, close to the suction surface 58, the inter-airfoil surface 70 has a first recess or a first depression F1 corresponding to the first recessed part F of the suction surface profile 80, located in the upstream part of the inter-airfoil channel, and a first apex G1 corresponding to the suction surface boss-like part G of the suction surface profile, located in the downstream part of the inter-airfoil channel 30. Also, close to the pressure surface 56', it has a second apex H1 corresponding to the pressure surface boss-like part H of the pressure surface profile 85, located in the upstream part of the inter-airfoil channel, and a second recess or a second depression I1 corresponding to the pressure surface boss-like part I of the pressure surface profile 85, located in the downstream part of the inter-airfoil channel 30.

The first maximum G1 and the second minimum I1 are located substantially upstream of the trailing edge so as to arrange for an area of revolution 44' close to the latter.

In FIG. 7, the local extremes of the inter-airfoil surface (with respect to the direction perpendicular to the above-mentioned cone) are placed substantially against the wall of the airfoil. It should be noted that this arrangement is not mandatory, as said extremes can be offset from the wall of the airfoil, or even possibly be separated therefrom by a protruding or receding shoulder.

Finally, it should be noted that the dotted lines represented in FIG. 8 indicate the shape of the surface of revolution going through the middle of segment DE. Thus, the radial offsets of points D and E respectively outwards and towards the center (upwards and downwards in the figure) with respect to this surface of revolution, respectively correspond to the suction surface recessed part of the suction surface profile, at E, and the pressure surface boss-like part of the pressure surface profile, at D.

The invention claimed is:

1. A blade for a turbomachine impeller, comprising:
an airfoil including a pressure surface, a suction surface, a trailing edge, a leading edge; and
a platform extending at one of ends of the airfoil in a direction that is globally perpendicular to a longitudinal direction of the airfoil; wherein
the blade is configured to be arranged with a plurality of substantially identical blades to form a ring around a ring axis and define therealong upstream and downstream directions, with the ring having the airfoils arranged substantially radially therein;
adjacent portions of platform surfaces of two adjacent blades located between their respective airfoils define an inter-airfoil surface;
a suction surface profile is projected on the platform surface at a constant distance from the suction surface;
a pressure surface profile along the pressure surface is projected on the platform surface at a constant distance from the pressure surface;
the pressure surface profile includes a pressure surface recessed part, at least 90% of said pressure surface recessed part being contained within a downstream half of the airfoil and at most 10% of said pressure surface recessed part lying in an upstream half of the airfoil;
most of the inter-airfoil surface is a surface with a shape corresponding to a motion from upstream to downstream of a line segment in a direction parallel to the ring axis, the line segment having a first end point on the suction surface profile and a second end point on the pressure surface profile, and presenting an angle relative to the ring axis; and
the angle is between 60 and 120 degrees.

2. The blade according to claim 1, wherein the suction surface profile includes a suction surface recessed part located axially in the upstream half of the airfoil, and a suction surface boss-like part, located axially downstream of the suction surface recessed part.

3. The blade according to claim 2, wherein the suction surface recessed part is located axially between 0 and 40% of the airfoil.

4. The blade according to claim 3, wherein a bottom point of the suction surface recessed part is located axially between 12% and 35% of the airfoil.

5. The blade according to claim 2, wherein the suction surface boss-like part is located axially between 40 and 80% of the airfoil.

6. The blade according to claim 2, wherein when such blades are assembled into a ring, sections of the platform surfaces of the assembled blades in a vicinity respectively upstream and downstream of the airfoils define an upstream median circle and a downstream median circle, these sections being perpendicular to the ring axis;
the circles define a cone coaxial to the ring axis and containing the circles;
the suction surface recessed part is depressed with respect to the cone; and the suction surface boss-like part protrudes with respect to the cone.

7. The blade according to claim 6, wherein the pressure surface recessed part is depressed with respect to the cone.

8. The blade according to claim 6, wherein the pressure surface profile further includes a pressure surface boss-like part, located axially mainly in an upstream half of the airfoil, and which is further protruding with respect to the cone.

9. The blade according to claim 1, wherein the pressure surface profile further includes a pressure surface boss-like part, located axially mainly in an upstream half of the airfoil.

10. The blade according to claim 9, wherein the pressure surface boss-like part is axially extending over more than three quarters of the airfoil.

11. The blade according to claim 9, wherein the pressure surface boss-like part is located axially between 0 and 50% of the airfoil.

12. The blade according to claim 1, wherein the recessed part continues downstream of the inter-airfoil surface.

13. The blade according to claim 1, wherein the platform surface further includes a portion shaped as a surface of revolution with respect to the ring axis, close to the pressure surface of the airfoil and located axially at about 75% of the airfoil.

14. The blade according to claim 1, wherein the platform surface includes a portion shaped as a surface of revolution with respect to the ring axis and located close to a trailing edge of the airfoil.

15. A turbomachine nozzle segment, comprising at least one blade according to claim 1.

16. An impeller comprising a plurality of blades according to claim 1.

17. A turbomachine comprising at least one impeller according to claim 16.

18. The blade according to claim 1, wherein at least three quarters of said inter-airfoil surface has said shape corresponding to said motion of said line segment, and wherein said motion of said line segment includes a motion of the end points of the line segment in a same direction along the suction surface profile and the pressure surface profile.

19. The blade according to claim 1, wherein the platform is located at a head of the airfoil, radially opposite a center of the turbomachine impeller.

* * * * *